(No Model.)
E. BROWN.
FLEXIBLE DOOR.
No. 528,358. Patented Oct. 30, 1894.
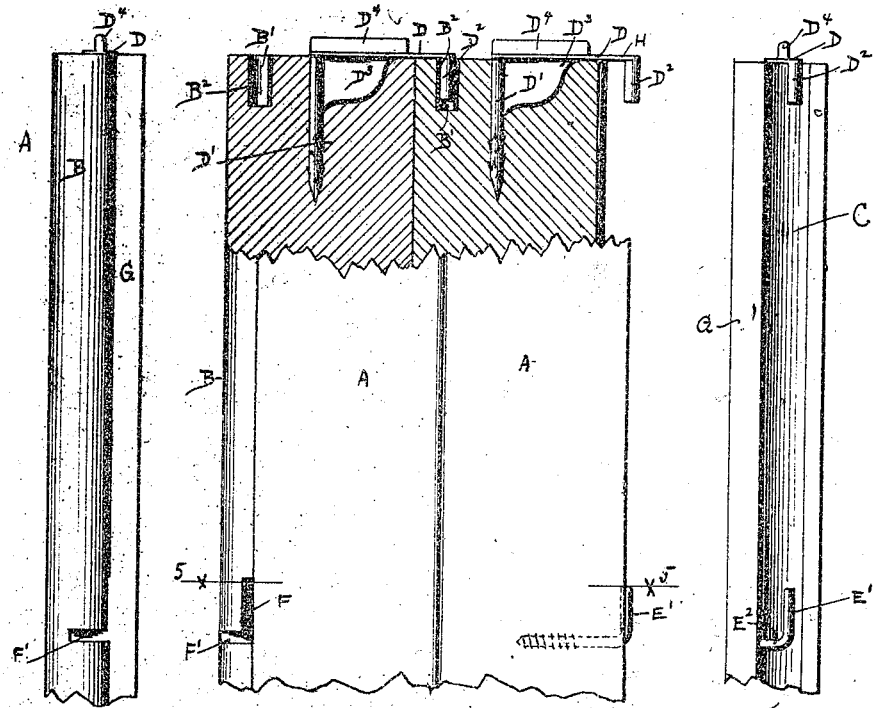

UNITED STATES PATENT OFFICE.

EDWIN BROWN, OF WORCESTER, MASSACHUSETTS, ASSIGNOR TO THE FLEXIBLE DOOR AND SHUTTER COMPANY, OF SAME PLACE AND PORTLAND, MAINE.

FLEXIBLE DOOR.

SPECIFICATION forming part of Letters Patent No. 528,358, dated October 30, 1894.

Application filed November 27, 1891. Serial No. 413,254. (No model.)

*To all whom it may concern:*

Be it known that I, EDWIN BROWN, a citizen of the United States, residing at Worcester, in the county of Worcester and State of Massachusetts, have invented a new and useful Improvement in Flexible Doors, of which the following is a specification, accompanied by drawings representing such portions of a flexible door as are necessary in order to illustrate my invention.

My invention relates to the method of hinging together strips of wood or other material at their edges, so said strips will form the leaves of a flexible door capable of being used to close a doorway, window opening, for the curtain of a roll top desk, the removable partition of a room and other like purposes.

In the accompanying drawings I have represented a portion of two strips of wood hinged together by the method forming the subject of my present invention; the door being formed of a succession of strips or leaves hinged together in the manner shown, each pair of hinged leaves being a duplicate of the two leaves a portion of which are represented in the accompanying drawings, in which—

Figure 1 represents a top or end view of two leaves hinged together at their edges. Fig. 2 is a front view showing a portion of the two hinged leaves with their ends represented in sectional view so as to disclose the staples by which the ends of the leaves are held together. Fig. 3 is an edge view of one of the leaves showing the barrel. Fig. 4 is a view of the opposite edge of the leaf showing the concave edge to receive the barrel of the adjacent leaf. Fig. 5 is a transverse sectional view of the hinged leaves shown on line X, X, Fig. 2. Fig. 6 is a section of one of the leaves shown in perspective view and representing the barrel notched to receive the pintle. Fig. 7 is a perspective view of a section of one of the leaves representing the concave edge and one of the pintles and Fig. 8 represents a bottom view of one of the staples by which the ends of the leaves are held together.

Similar letters refer to similar parts in the several figures.

A door embodying my invention consists of a series of strips, or leaves of wood, or other suitable material, placed side by side and hinged together at their edges so the door may be bent or curved by the flexure of the hinged joint and the accompanying drawings represent the ends of two strips or leaves; enough of the leaves being shown to fully illustrate the method of hinging them together, which forms the subject of my invention.

The leaves A, A, are duplicates of each other and consist of a narrow strip having a cylindrical barrel B formed on one edge, the opposite edge being provided with a concave groove C to receive the barrel of the adjacent leaf. These barrels and grooves, formed upon the opposite sides of the leaves, extend throughout their entire length, each leaf being as long as the desired width or height of the door. The barrels B are provided at their ends with concentric holes B′, in which I prefer to place a metallic sleeve B² in order to reduce wear.

The ends of the leaves are hinged together by means of staples, represented in top view in Fig. 1, in elevation in Fig. 2, and in bottom view in Fig. 8, each of which consists of a plate D, forming the crown of the staple and having at one end a pointed and barbed leg D′, which is driven into the central section of the leaf and at the other end a short cylindrical leg D² entering the metallic sleeve B² and forming a pintle about which the barrel B turns. In the angle between the leg D′ and the crown D is a web D³, which is inserted in the end of the leaf to prevent the rotation of the staple about the leg D′.

Extending upward from the crown D is a rib D⁴ placed in a plane parallel with the plane of the leaf and which can be made to enter and slide in grooves in the floor or casing of the doorway, if desired. In Figs. 1 and 2 the ends of the leaves are shown as provided with staples as described, by which the ends of the leaves are hinged together and the staples employed upon the opposite end of the leaves, not shown, are an exact duplicate of those represented in the drawings.

In case the door is composed of short leaves, the hinging staples placed at their opposite ends, as already described, would be sufficient to hinge them together but in the case of an ordinary door as the leaves would necessarily be six or seven feet in length, or even more, it becomes necessary to unite the leaves at short intervals throughout their length and this is accomplished by inserting a wire E in the concave edge of the leaf and at right angles thereto, the projecting wire being bent so as to bring the section E' into a position parallel and concentric with the concave edge of the leaf so as to form a pintle.

The barrel B is provided with a chamber F opened at the side to receive the pintle E', and also with a notch F' communicating with the chamber F, to receive the bent section $E^2$ and allow the barrel to rotate on the pintle E'.

The leaves A, A, are provided with shoulders G, which are brought into contact as the leaves are extended and brought into the same plane and which prevent the barrels turning upon the pintles, when the leaves are extended, except in one direction and as the chamber F and notch F' are opened upon the side next the shoulder G, they are completely covered and hid from view when the leaves are brought into the same plane as shown in Fig. 1.

The wires E are inserted in the leaves A at one side of the plane containing the pintles E' and they are bent at $E^2$ so as to bring the pintles E' concentric with the concave groove C. This position and form of the wire E allows the barrel to turn about the pintle without requiring the notch F' to be extended across the barrel far enough to be uncovered by the concave edge C when the leaves are extended in the same plane; the extent of the notch F' being indicated in Fig. 5 by the broken lines $F^2$.

When the door is opened to close the door way, the leaves are brought into the same plane in the position represented by the two leaves shown in Figs. 1, 2 and 5 and in which the open chamber F and the notch F' are entirely covered by the concave edge C of the adjacent leaf. If desired, however, the open side of the chamber F may be closed by a block of wood nailed or glued into position, and if desired a metal bushing can be inserted in the chamber F to receive the wear of the pintle E'.

The barbed legs D' of the staples are preferably driven into the end of the leaves midway their opposite sides and as, in the construction shown in the accompanying drawings, the centers of the barrels lie in a plane at one side the centers of the leaves I curve the plates D at H so as to bring the plates in alignment with each other and with all the guide ribs $D^4$ lying in the same plane so they may slide freely in a narrow slot or groove in the door casing.

What I claim as my invention, and desire to secure by Letters Patent, is—

1. In a flexible door, the combination of a series of parallel leaves provided with convex edges forming barrels and concave edges to receive said barrels and staples by which the ends of said leaves are united, each of said staples having one leg driven into the ends of the leaves and having the other leg journaled concentrically in the ends of the barrels of the adjacent leaves, substantially as described.

2. In a flexible door, the combination of a series of parallel leaves hinged together at their ends by staples, hinging staples, each of said staples having one leg held in the end of a leaf and the other leg journaled in an adjacent leaf, substantially as described.

3. In a flexible door, the combination of a series of parallel leaves hinged at their ends by staples, staples attached to the ends of the leaves and provided with webs entering said leaves to hold said staples from lateral motion, said staples being provided with a leg journaled in the adjacent leaf, substantially as described.

4. In a flexible door, the combination of a series of parallel leaves hinged together at their ends by staples, hinging staples uniting the ends of said leaves, said staples being provided with projecting ribs forming guides by which the movement of the door is directed, substantially as described.

5. In a flexible door, the combination of a pair of leaves, one of said leaves having a convex edge and the other leaf having a concave edge fitting said convex edge and forming an articulated joint, wires projecting from the concave edge of the leaf at one side of the plane uniting the centers of said articulated joint, said wires being bent at $E^2$ to bring their ends coincident with the axis of the articulated joint to form pintles, substantially as described.

6. In a flexible door, the combination of a series of parallel strips hinged together at their edges and forming leaves, said leaves having one edge convex to form a barrel and the opposite edge concave to receive the convex barrel of the adjacent leaf, pintles projecting from the concave edges of said leaves and said convex edges being provided with notches to receive said pintles substantially as described.

Dated at Worcester, in the county of Worcester and State of Massachusetts, this 24th day of November, 1891.

EDWIN BROWN.

Witnesses:
RUFUS B. FOWLER,
EMMA KESTER.